(12) United States Patent
Senst et al.

(10) Patent No.: US 8,983,000 B2
(45) Date of Patent: Mar. 17, 2015

(54) RECEIVER CIRCUIT AND METHOD FOR OPERATING A RECEIVER CIRCUIT

(71) Applicants: Andreas Senst, Munich (DE); Manfred Zimmermann, Sauerlach (DE); Clemens Buchacher, Munich (DE); Peter Noest, Munich (DE)

(72) Inventors: Andreas Senst, Munich (DE); Manfred Zimmermann, Sauerlach (DE); Clemens Buchacher, Munich (DE); Peter Noest, Munich (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/654,502

(22) Filed: Oct. 18, 2012

(65) Prior Publication Data

US 2013/0101070 A1 Apr. 25, 2013

(30) Foreign Application Priority Data

Oct. 19, 2011 (DE) .......................... 10 2011 054 614

(51) Int. Cl.
*H03K 9/00* (2006.01)
*H04L 7/00* (2006.01)
*H04L 25/02* (2006.01)
*H04L 25/03* (2006.01)
*H04L 7/04* (2006.01)
*H04L 27/00* (2006.01)

(52) U.S. Cl.
CPC ............ *H04L 7/002* (2013.01); *H04L 25/0212* (2013.01); *H04L 25/03019* (2013.01); *H04L 7/042* (2013.01); *H04L 2027/0048* (2013.01); *H04L 2027/0067* (2013.01)
USPC ........... 375/316; 341/118; 370/208; 375/226; 375/232; 375/350

(58) Field of Classification Search
CPC .............. H04L 1/205; H04L 25/03038; H04L 27/2647; H04L 1/06
USPC .................. 375/226, 232, 316, 350, 355, 371
See application file for complete search history.

(56) References Cited

U.S. PATENT DOCUMENTS

| | | | |
|---|---|---|---|
| 3,868,603 A | 2/1975 | Guidoux | |
| 4,646,173 A * | 2/1987 | Kammeyer et al. | 360/51 |
| 5,872,818 A | 2/1999 | Choi | |
| 5,982,832 A | 11/1999 | Ko | |
| 7,010,023 B1 * | 3/2006 | Sato | 375/150 |
| 2004/0151269 A1 * | 8/2004 | Balakrishnan et al. | 375/355 |
| 2005/0117679 A1 * | 6/2005 | Paul et al. | 375/354 |
| 2007/0253319 A1 * | 11/2007 | Jansen | 370/208 |
| 2010/0164764 A1 * | 7/2010 | Nayak | 341/118 |
| 2011/0142152 A1 * | 6/2011 | Bellanger | 375/261 |
| 2012/0163443 A1 * | 6/2012 | Cookman et al. | 375/232 |
| 2012/0250810 A1 * | 10/2012 | Lolis et al. | 375/350 |

FOREIGN PATENT DOCUMENTS

GB 1466678 A 3/1977

\* cited by examiner

*Primary Examiner* — Leon-Viet Nguyen
(74) *Attorney, Agent, or Firm* — Eschweiler & Associates, LLC

(57) ABSTRACT

A receiver circuit includes a unit configured to determine filter coefficients based on a sampling time error of a received signal and a phase error of the received signal, as well as a filter configured to filter a signal, which is based on the received signal, based on the filter coefficients.

19 Claims, 2 Drawing Sheets

RECEIVER CIRCUIT AND METHOD FOR OPERATING A RECEIVER CIRCUIT

REFERENCE TO RELATED APPLICATION

This application claims priority to German application number 10 2011 054 614.6, filed on Oct. 19, 2011.

FIELD

The invention concerns the field of mobile radio communication. The invention particularly relates to a receiver circuit and a method for the operation of a receiver circuit.

BACKGROUND

In mobile radio communication systems, signals can be transmitted via various transmission paths from a transmitter to a receiver, and can differ with respect to their propagation times and phases. The transmitted signals are sampled in receivers, wherein sample timing errors can occur.

Receivers, the components thereof, and methods for the operation of the components are continuously improved with regards to their power and quality. In particular, it can be desirable to improve a filtering of receiver signals carried out in receiver circuits. For these and further reasons, there is a need for the present invention.

DETAILED DESCRIPTION

Figure 1:
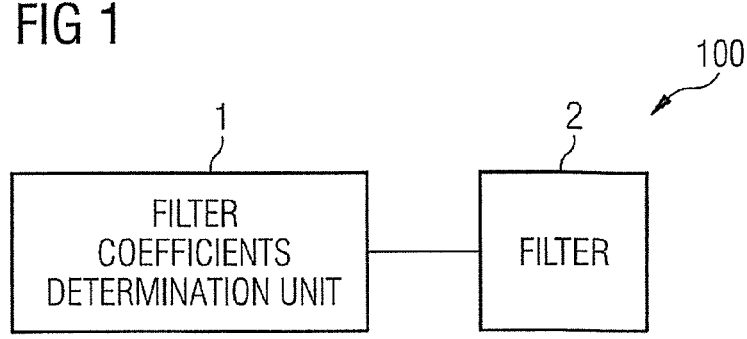
FIG. 1 is a schematic receiver circuit 100 according to one embodiment.

Aspects are described below with reference to the figures, wherein identical reference numbers indicate the same or similar components. In the following description, numerous specific details can be illustrated in order to provide a better understanding of the aspects. However, for a person skilled in the art, it can be recognized that one or more aspects of the aspects can also be implemented in practice without these specific details. The following description is therefore not intended to be restrictive in nature. The scope of protection should be defined by the attached patent claims.

The various aspects of the invention can be implemented by various examples. Some of these aspects are illustrated and described below for the purpose of demonstration. Of course, the aspects described in this context are only exemplary in nature. Further aspects can likewise be used and/or structural and functional modifications can be undertaken to the described aspects without deviating from the scope of the present disclosure. Certain features can potentially be described in the context of one aspect. Of course, such features can also be combined with features of other aspects, according to whether this appears desirable or advantageous with regard to the aspect upon which the aspect is based.

In the following, terms such as "include", "contain", "having", or the like should be understood to convey the meaning of "comprise", meaning that they do not characterize an exhaustive list of included components. Moreover, the terms "coupled", "electronically coupled", "connected" or "electronically connected" can be used. These terms should specify that two elements work together or interact with each other, regardless of whether they are in direct physical or electrical contact or whether they are not in direct contact to each other. Of course, further components can be arranged between the two elements. The aspects of the invention can be implemented in the form of discrete circuits and/or partially integrated circuits and/or fully integrated circuits and/or by means of software.

In the following paragraphs, several technical concepts are explained which should serve to improve understanding of the subsequent description of the aspects illustrated in the figures.

The devices and methods described herein can be used for various different wireless communication networks, such as CDMA (code division multiple access), TDMA (time division multiple access), FDMA (frequency division multiple access), OFDMA (orthogonal FDMA) and SC-FDMA (single carrier FDMA) networks, for example. A CDMA network can implement a radio technology, such as universal terrestrial radio access (UTRA), cdma2000, etc., for example. UTRA includes broadband CDMA (W-CDMA) and other CDMA variants; cdma2000 covers the IS-2000, IS-95, and IS-856 standards. A TDMA network can implement a radio technology such as global system for mobile communications (GSM) and the derivatives thereof, for example, such as EDGE (enhanced data rate for GSM evolution), EGPRS (enhanced general packet radio service), etc., for example. An OFDMA network can implement radio technology such as evolved-UTRA (E-UTRA), ultra mobile broadband (UMB), IEEE 802.11 (Wi-Fi), IEEE 802.16 (WiMAX), IEEE 802.20, Flash-OFDM®, etc., for example. UTRA and E-UTRA are a part of the universal mobile telecommunication system (UMTS). In addition, the devices and methods described herein can be used as part of the long term evolution (LTE) mobile radio communication standard.

In addition, the devices and methods described herein can support HSDPA (high-speed downlink packet access). Current applications of HSDPA can provide downlink data rates of 1.8, 3.6, 7.2, and 14.0 Mbit/s. Further increases in the data rate can be achieved by means of HSDPA+, which can provide data rates up to 42 Mbit/s and 84 Mbit/s. Mobile terminals which support HSDPA are divided into different categories according to data rate, modulation scheme, and additional parameters. High data rates are included in the categories cat10 and cat14, for example. In such categories, a precise temporal synchronization of the receiver to the chip rate of the received signals is required for an error-free reception. For 21 Mbit/s reception, a precision of the fractions of a UMTS chip is required wherein 38,400 chips corresponds to a duration of 10 milliseconds (ms).

In radio communication systems, a transmitter which transmits one or more radio communication signals via one or more radio communication channels can be included. The transmitter can be a base station or a transmitting device which is included in a device of a user, such as a mobile radio transmitter/receiver, a handheld radio device, or a similar device, for example. The radio communication signals transmitted by the transmitter can be received by receivers, such as a receiver device in a mobile radio transmitter/receiver, a handheld radio device, or a similar device, for example. The receiver circuits described herein can particularly be included in such receivers. The radio communication signals can be transmitted via physical radio communication channels, for example, such as primary common pilot channels, secondary common pilot channels, dedicated physical channels, dedicated physical control channels, or similar channels, for example.

Signals transmitted by a transmitter can follow different transmission paths in order to reach a receiver. This phenomenon can create a multi-path channel which has a plurality of transmission paths with different time delays. Each of these transmission paths can be assigned to a delay time. When the energy of the signals received at a receiver is observed, energy peaks are present in the delay times of the signals transmitted via the different transmission paths. The amplitude of an energy peak in this case is a measure of the energy which was transmitted via the associated transmission path. Such an energy distribution is known, for example, by the term "power delay profile", and can be determined by a so-called path searcher or a delay profile estimator. The delay time of a received signal can be corrected in the receiver. The correction of the delay time in this case can particularly be larger or the same as half the chip rate.

In addition to the delay times mentioned above, a (complex value) signal transmitted by a transmitter in a manner depending on the transmission channel may undergo a phase rotation and/or a phase error. For example, if symbols of a pilot channel are not received at the receiver with a phase of 45° as transmitted from the transmitter, but rather with a phase of 50°, the phase error is 5°.

A digital signal processing can be performed in a receiver in an intermediate frequency band or the base band, wherein a received analog signal must be sampled and quantized. This process is called analog signal conversion. The sampling frequency in this case must be chosen to be sufficiently large to meet the Nyquist condition. For example, the sampling rate can correspond to twice the chip rate. The optimum sampling time point is determined by the time point of maximum energy of a received information unit (a bit and/or chip). However, this optimum sampling time point is not known during the sampling process. The result of this is that the sampled discrete value received signals generally have a sampling time error (deviation of the used sampling time point from the optimum sampling time point). The sampling time error can therefore correspond to a temporal shift between an extremum of a signal pulse of the received signal and a sampling time point of this signal pulse, for example, or can contain such a temporal shift. The sampling time error can particularly be smaller than half of the chip rate.

The determination of the sampling time error of the discrete value received signal can be carried out by means of a correlator, for example. The correlator receives the discrete value received signal sampled in double oversampling, correlates it with a known sequence in the receiver, and compares the signal energies of the early and the late samplings over a certain duration. Using this comparison, the correlator determines a sampling time error signal which gives the deviation of the sampling time point from the optimum time point (if, for example, the signal energy of the early samplings has the same amplitude as the signal energy of the late samplings, the optimum sampling time point is exactly in the middle of the sampling time point for the early and the late samplings).

In the following paragraphs, several embodiments are described. The details given in this context can be carried over to corresponding methods for the operation of such receiver circuits.

FIG. 1 shows a receiver circuit 100 having a unit 1 for the determination of filter coefficients depending on a sampling time error of a received signal and a phase error of the received signal. In addition, the receiver circuit 100 includes a filter 2 configured to filter a signal which is dependent on the received signal depending on the filter coefficient. The receiver circuit 100 can include additional components which are not explicitly illustrated for reasons of clarity. Similar receiver circuits are illustrated in FIGS. 2 and 3 with additional components.

The filter 2 can be an interpolation filter, for example, a finite impulse response (FIR) filter with complex coefficients. Due to the use of complex coefficients, it is possible to carry out both a temporal correction of a sampling time error and a correction of a phase error of a signal being filtered.

Figure 2:
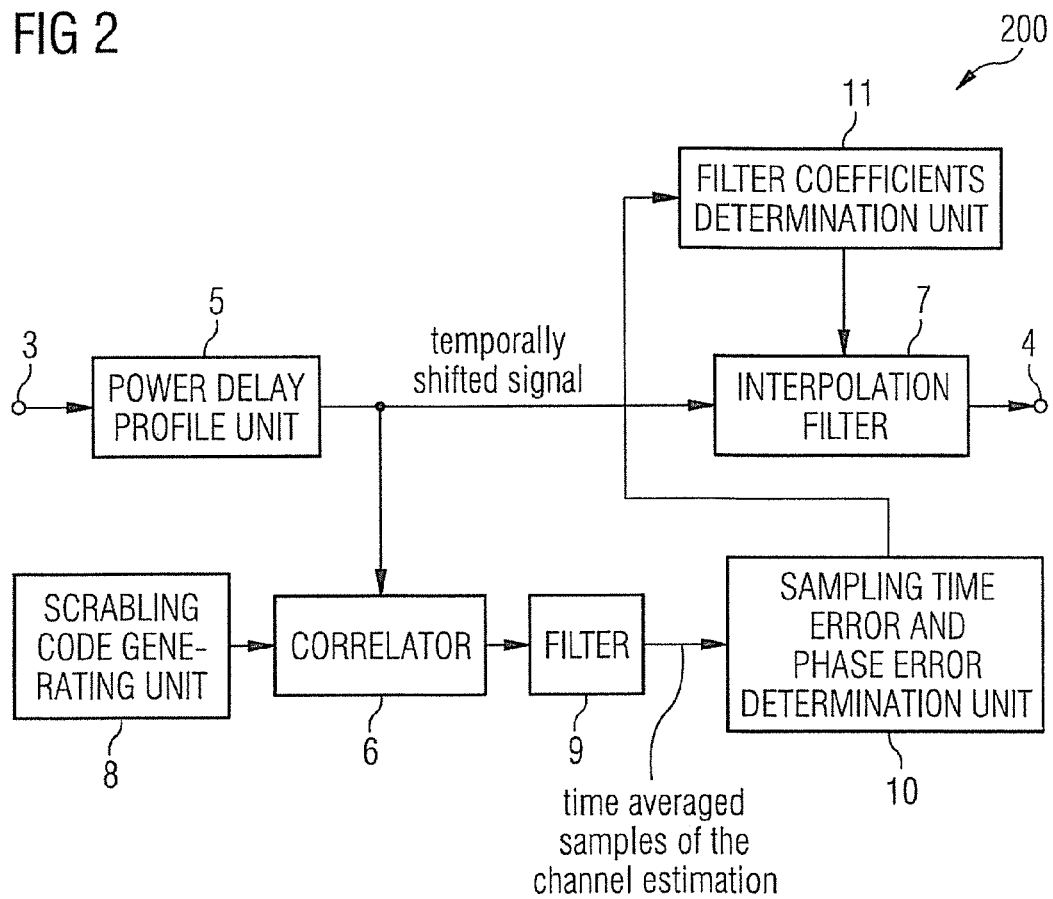
FIG. 2 is a schematic receiver circuit 200 according to one embodiment.
Figure 3:
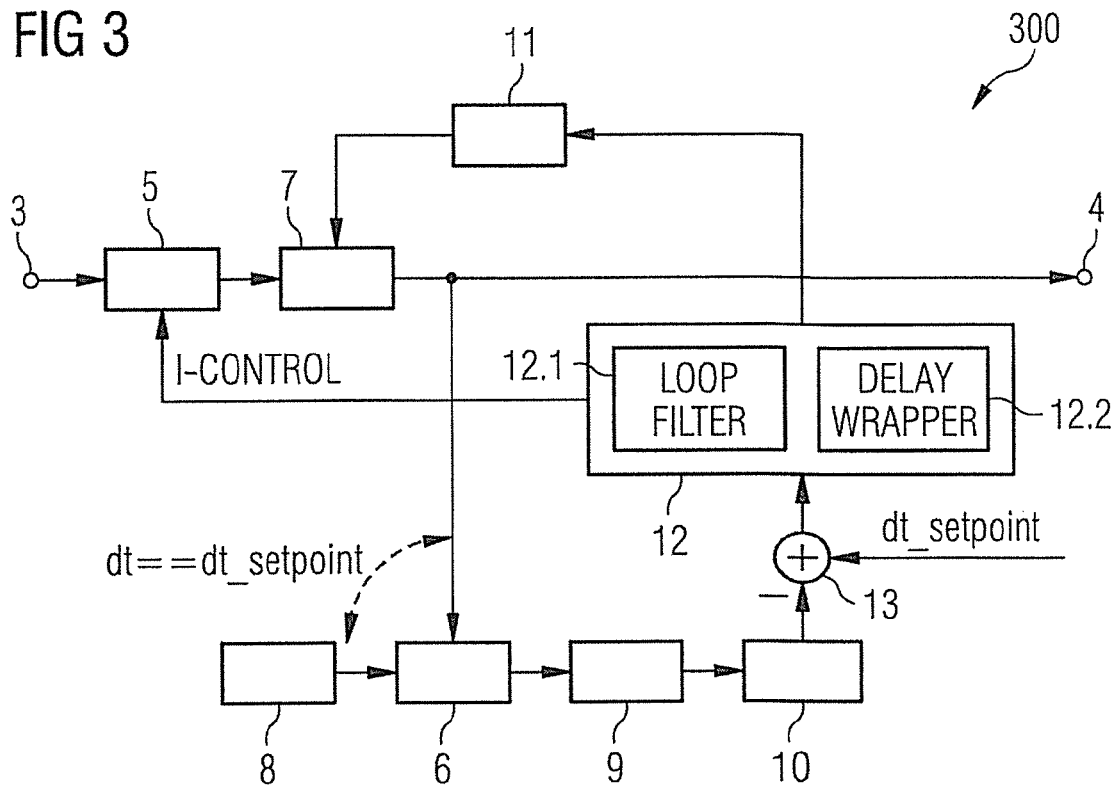
FIG. 3 is a schematic receiver circuit 300 according to one embodiment.

FIG. 2 shows a receiver circuit 200, having an input 3 and an output 4, as well as components arranged between these. Of course, the receiver circuit 200 can have further components. For example, in one aspect, the receive circuit 200 can include a signal receiver path directly after the input 3 with an amplifier chain fed by the antenna and band filter, and a downlink mixer unit for downlink mixing the received signal to an intermediate frequency or to the base band, as well as an ADC (analogue to digital converter), along with a subsequent digital channel filter.

The receiver circuit 200 contains a unit 5 that receives a signal received by the receiver circuit 200 at the input 3 and determines a power delay profile for this signal. The signal fed to the unit 5 can be an IQ (in-phase/quadrature)—modulated digital signal clocked at double the chip rate, for example. The determined delay time of the received signal can be used by the unit 5 to temporally shift the received signal according to the delay time. To this end, the unit 5 can include one or more delay elements. The shift in this case can be larger or the same as half the chip rate. In one embodiment the temporal shift can correspond to a whole-number multiple of half the chip rate. As such, if a delay time of 3.3 half chips is determined for the received signal, for example, then the signal can be shifted three half chips by the unit 5.

The temporally shifted signal is forwarded by the unit 5 to a correlator 6 and to an interpolation filter 7. In addition to the temporally shifted signal, the correlator 6 can receive a scrambling code from a unit 8 configured to generate scrambling codes.

The correlator 6 is configured to determine a channel impulse response according to the received signal. For this purpose, a correlation can be carried out, for example, between a training sequence contained in the received signal and a reference training sequence known to the receiver circuit 200. The channel estimation values and/or samples of the channel estimation are forwarded by the correlator 6 to a filter 9, which is configured to average the channel estimation values over an arbitrary time interval.

The time-averaged samples of the channel estimation are forwarded by the filter 9 to a unit 10 which functions to determine a sampling time error $\tau$ of the received signal. The sampling time error $\tau$ can be determined utilizing the equation $$\mathcal{R}\left\{ \frac{\sum_s z(s) dr(s-\tau)}{\sum_s z(s) r(s-\tau)} \right\} = \frac{\sum_s r(s-\tau) dr(s-\tau)}{\sum_s r(s-\tau) r(s-\tau)} \quad (1)$$

wherein the symbol $\mathcal{R}$ stands for the real part of the complex argument. In addition, the variable $z(s)$ corresponds to a sample of the channel estimation at a time point s, the variable $r(s)$ corresponds to a reference impulse and/or a reference function (e.g. a raised cosine reference pulse) at a time point s, and the variable $dr(s)$ corresponds to a derivative of the reference pulse with respect to the sampling time error $\tau$, i.e.

$$\frac{dr(s)}{d\tau}.$$

The sums in the equation (1) run over the samples of the channel estimation indicated by s. For example, if three samples are used, the sums can run over the values s=−1, 0, 1, wherein z(0) corresponds to the strongest sample (primary tap or main tap).

The equation (1) can be solved iteratively, wherein the iteration is started with an arbitrary value for the sampling time error τ. For example, a start value for τ can be used which was determined in the solution of the equation (1) for a previous time point, for example a previous slot. For the selected start value, then, both sides of the equation (1) are calculated and—according to which side of the equation assumes the larger value—the value for the sampling time error τ is increased or reduced in the next iteration step. The iteration steps can be repeated until both sides of the equation are the same and/or deviate from each other by less than a predetermined threshold (which is not equal to zero). The equation (1) is solved by the sampling time error τ determined in this way.

In addition to a calculation of a sampling time error τ, the unit 10 can further be configured to determine a phase error Δφ of the received signal. For this purpose, a correlation can first be determined, for example, between the channel estimation values already used in the determination of the sampling time error τ and a reference function (e.g. a raised cosine reference pulse) shifted by the sampling time error previously determined by the solution of the equation (1), according to the equation $$C(\tau) = \sum_s z(s)r(s-\tau). \qquad (2)$$

The phase error Δφ can then be determined from the equation $$\Delta\phi = \arg(C). \qquad (3)$$

The values determined by the unit 10 for the sampling time error and the phase error Δφ are forwarded to a unit 11 which is configured to determine filter coefficients for the interpolation filter 7 depending on τ and Δφ. In addition to the value τ and Δφ, of course further variables can be determined by the unit 10 and forwarded to the unit 11. By way of example, the value of the variable C (see equation (2)) can be passed on to the unit 11. This value can represent an estimated value for the amplification of the received signal acquired on the transmission channel.

One example determination of filter coefficients by the unit 11 depending on a sampling time error τ and a phase error Δφ is described below. If the interpolation filter 7 includes or corresponds to a FIR filter (or a Lagrange delay filter) of the length 11 (11 tap filter), for example, then it is possible to determine 11 real-valued filter coefficients (taps) b(0) to b(10) by means of the following code for the program MAT-LAB. In this code, the variable "filterorder" indicates the number of the filter coefficients of the filter, wherein it is noted that the "for"-loops contained in the code function run over the 11 values 0 to 10. The variable "delay" may correspond to the sampling time error τ of equation (1).

```
filterorder=10
```

```
for m=0:filterorder
    for k=0:filterorder
        if k~=m
            M1(k+1)=(Delay-k)/(m-k);
        else
            M1(k+1)=1;
        end
    end
    b(m+1)=prod(M1);
    clear M1;
end
```

Using a FIR filter based on the real-valued filter coefficients b(0) to b(10), it is possible to correct the sampling time error i of a received signal. By means of an additional rotation of the real-valued coefficients b about the phase error Δφ from equation (3), i.e. using the equation $$b_c = b \cdot e^{-i\Delta\phi}, \qquad (4)$$

it is possible to determine complex-valued filter coefficients $b_c(\mathbf{0})$ to $b_c(\mathbf{10})$. By means of a FIR filter based on these complex-valued coefficients, it is possible to perform a common correction of a sampling time error and of a phase error.

By means of the exemplary 11-tap filter described above, it is possible to particularly achieve temporal delays of a signal of a value between 0 half chips and 10 half chips. For example, the filter can be operated symmetrically such that only the center tap of the filter should be non-zero in the filter center setting. In the case of the described 11-tap filter, the fifth tap b(5) would then correspond to the center tap. If only the fifth tap b(5) is non-zero, the filter delays an input signal by 5 half chips, meaning that the delay adjusting range of the filter is centered on 5 half chips. The described 11-tap filter has the lowest group delay error and amplitude error in the adjusting range from [4.5 . . . 5.5], and in one embodiment is used in the adjusting range for implementing variable delays.

The described determination of the filter coefficients by the unit 11 can take place adaptively during the operation of the receiver circuit 200, by means of a calculation unit (not illustrated). As an alternative, or at the same time, the receiver circuit 200 can also comprise a storage device or memory (not illustrated) for the purpose of storing filter coefficients, wherein the filter coefficients may be read out from the storage device during the operation of the receiver circuit 200, and can be made available to the interpolation filter 7. By way of example, samples of the filter coefficients for any delay, for example in 0.01-chip steps, can be saved in a table in the receiver circuit 200.

The receiver circuit 200 can include a further unit (not illustrated) which decides whether a signal filtering is carried out by means of the interpolation filter 7, or a signal processing is carried out by means of a component which is an alternative to the interpolation filter 7—for example by means of a FIR equalizer which functions based on the linear minimum mean squared error (LMMSE) principle. The decision in this case can be dependent on a signal/noise ratio based on the received signal, for example. If there is a low-noise additive white Gaussian noise (AWGN) channel, the use of the interpolation filter 7 can be more advantageous than, for example, the use of a FIR equalizer working on the linear minimum mean squared error (LMMSE) principle. The decision mentioned above can furthermore be dependent on a channel code rate based on the received signal, and/or dependent on a comparison of a channel impulse value based on the received signal and a channel impulse response of an AWGN channel.

The interpolated signal is forwarded from the interpolation filter 7, for example in the form of an IQ (in-phase/quadrature)-modulated digital signal, to the output 4 of the receiver circuit 200. Of course, additional components can be arranged between the interpolation filter 7 and the output 4 of the receiver circuit 200—for example a device for spreading a signal which is output by the interpolation filter 7, if this signal has been previously spread by a spreading code.

FIG. 3 shows a receiver circuit 300 with components which have already been described in the context of the receiver circuit 200. The statements made in this regard can also be applied to the corresponding components in FIG. 3.

The receiver circuit 300 receives a signal at an input 3 and forwards this to a unit 5. The signal which is input to the input 5 can be temporally shifted to a whole-number sum of half chips. The temporal shift is indicated by an I-CONTROL variable in FIG. 3, which is made available to the unit 5 by a unit 12 via a feedback path. By way of example, if the I-CONTROL value is three, then the signal which is input to the unit 5 is shifted by three half chips. The temporally shifted signal is relayed on to an interpolation filter 7 which obtains filter coefficients from a unit 11. The signal filtered by the interpolation filter 7 is relayed to both the output 4 of the receiver circuit 300 and a correlator 6. The filtered signal is processed in the manner described above in the context of FIG. 2, by means of a unit 8, the correlator 6, an (optional) filter 9, and a unit 10, such that a sampling error $\tau$ and a phase error $\Delta$ can be made available at an output of the unit 10.

The sampling time error $\tau$ determined by the unit 10 is corrected by a summer 13 with a value dt_setpoint. The dt_setpoint correction value is a desired total delay at the output of the interpolation filter 7 relative to the internal time base of the receiver circuit 300. The total delay in this case always includes the signal delay implemented by the transmission channel, the signal delay implemented by a front-end, the signal delay implemented by the unit 5, and the signal delay implemented by the interpolation filter 7. During the operation of the receiver circuit 300, the value dt_setpoint can in one embodiment be zero. In this case, the signal at the output of the interpolation filter 7 is synchronous with the internal time base of the receiver circuit 300.

The unit 12 can include two sub-units 12.1 and 12.2. The value corrected with the dt_setpoint correction value is relayed to the first sub-unit 12.1, which can be designed as a loop filter in the form of a simple digital integrator, for example. The first sub-unit 12.1 is configured to provide a value and relaying the same to the second sub-unit 12.2, the value corresponding to the total delay—meaning the amount of delay by which the input signal should be delayed overall by the unit 5 and by the interpolation filter 7.

The second sub-unit 12.2, which can also be characterized as a "delay wrapper", divides the value provided by the unit 12.1 into the whole-number value I-CONTROL, and a remaining, non-whole-number value (each in half chips). The whole-number value I-CONTROL is forwarded to the unit 5, which temporally shifts the input signal by a corresponding value in half chips. The non-whole-number fraction corresponds to the "delay" value required for the MATLAB code given above, and is forwarded to the unit 11 used for calculating the filter coefficients. By means of the unit 11, it is possible, as described above in the context of FIG. 2, to determine coefficients of the interpolation filter 7, and forward these to the interpolation filter 7.

In contrast to the receiver circuit 200, the receiver circuit 300 has a closed control circuit. The behavior of this closed control circuit can be configured such that it provides stable control to maintain a constant target value for dt_setpoint. The value for dt_setpoint in this case can particularly be near zero. The stability of the control circuit can be ensured by means of the dimensioning of the loop filter 12.1, for example. In the event that this is designed in the form of a simple digital integrator, it is possible to incorporate an averaging time of the filter 9 into the dimensioning of the proportionality factor of the integrator.

Figure 4:
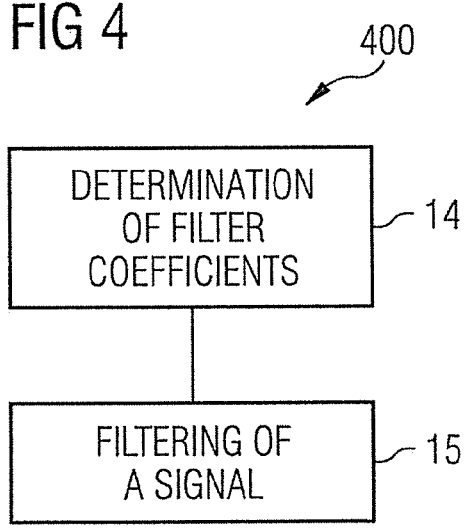
FIG. 4 is a schematic receiver circuit 400 according to one embodiment.

FIG. 4 shows a method 400 which may be read in connection with each of the receiver circuits 100, 200, and 300, but is not restricted thereto. In a first act 14, filter coefficients are determined depending on a sampling time error of the received signal and a phase error of the received signal (see e.g. FIG. 1, unit 1). In a second act 15, a signal based on the received signal is filtered depending on the filter coefficients (see e.g. FIG. 1, unit 2).

In addition to the receiver circuits and methods described above for the operation of the receiver circuits, of course there are other possibilities for correcting a received signal with respect to errors which arise. As mentioned above, a FIR equalizer can be used for this purpose, the same functioning based on an LMMSE principle, for example. In this case, it should be noted that approximately 40 channel values, for example, need to be estimated for a practical correction by means of such an equalizer. As in the previous paragraphs, in contrast to this configuration, fewer channel estimation values are sufficient for the purpose of providing a practical use of the described interpolation filter—for example three.

Although specific aspects were described in the previous description, it is clear that a number of alternative and/or equivalent implementations can be used for the specific aspects shown and described above, without deviating from the concept of the present invention. The present invention should cover the scope of all adaptations or variations of the specific aspects discussed herein.

What is claimed is:

1. A receiver circuit, comprising:
a filter coefficient determination unit configured to determine filter coefficients based on a sampling time error of a received signal and a phase error of the received signal;
an interpolation filter configured to filter a temporally shifted signal based on the determined filter coefficients, wherein the temporally shifted signal depends on the received signal, and
a power delay profile unit configured to receive the received signal and a control variable via a feedback path from a delay wrapper, and temporally shift the received signal based on a corresponding value of the control variable;
wherein the sampling time error comprises a temporal shift between an extremum of a signal pulse of the received signal and a sampling time point of the signal pulse,
wherein the temporal shift is determined based on a correlation of a portion of the received signal with a known reference sequence.

2. The receiver circuit of claim 1, wherein the interpolation filter is configured to temporally shift the received signal that is to be filtered depending on the sampling time error, and rotate a phase of the received signal that is to be filtered depending on the phase error.

3. The receiver circuit of claim 1, wherein the sampling time error is smaller than half a chip rate.

4. The receiver circuit of claim 1, further comprising:
a correlator unit configured to determine a channel impulse response depending on the received signal; and
a determination unit configured to determine the sampling time error depending on the channel impulse response and a reference function, and provide the determined sampling time error to the filter coefficient determination unit configured to determine the filter coefficients.

5. The receiver circuit of claim 4, wherein the correlator unit is arranged upstream of the interpolation filter and further configured to determine the channel impulse response based on an output of the interpolation filter.

6. The receiver circuit of claim 4, wherein the correlator unit is further configured to determine the channel impulse response based on the temporally shifted signal.

7. The receiver circuit of claim 1, wherein the phase error depends on a transmission path of the received signal.

8. The receiver circuit of claim 4,
wherein the determination unit is further configured to determine the phase error depending on the channel impulse response and the reference function, and provide the determined phase error to the filter coefficient determination unit configured to determine the filter coefficients.

9. The receiver circuit of claim 1,
wherein the power delay profile unit is further configured to determine a delay time of the received signal, determine a power delay profile comprising an energy distribution of at least one energy peak in the determined delay time that is associated with a transmission path of the received signal, generate the temporally shifted signal based on the delay time and provide the temporally shifted signal to the interpolation filter.

10. The receiver circuit of claim 1, further comprising:
a correlator unit configured to determine a channel impulse response from an output of the interpolation filter;
a determination unit configured to determine the sampling time error based on the channel impulse response from the correlator unit; and
a summer, coupled to the determination unit, configured to correct the sampling time error determined by the determination unit with a setpoint correction value, wherein the setpoint correction value that is a desired total delay at an output of the interpolation filter that is relative to an internal time base of the receiver circuit.

11. The receiver circuit of claim 10, wherein the desired total delay comprises an amount of delay by which the received signal is delayed overall by the power delay profile unit and the interpolation filter.

12. The receiver circuit of claim 1,
wherein the delay wrapper is coupled to further configured to provide the control variable to the power delay unit via the feedback path.

13. The receiver circuit of claim 1, further comprising:
a unit configured to decide whether a filtering is carried out by the interpolation filter, wherein the decision is based on a channel code rate of the received signal, and/or on a comparison of a channel impulse response depending on the received signal to a channel impulse response of an additive white Gaussian noise (AWGN) channel.

14. The receiver circuit of claim 1, further comprising:
a unit configured to generate a decision that comprises whether a filtering of the signal is performed by the interpolation filter or by an equalizer configured to filter the signal based on a linear minimum mean squared error principle, based on a signal/noise ratio depending on the received signal, and/or on a channel code rate based on the received signal, and/or on a comparison of a channel impulse response depending on the received signal to a channel impulse response of an AWGN channel.

15. The receiver circuit of claim 1, wherein the interpolation filter comprises a finite impulse response (FIR) filter.

16. The receiver circuit of claim 1, further comprising:
a storage device configured to store the determined filter coefficients, wherein the filter coefficients are read out of the storage device during an operation of the receiver circuit and are provided to the interpolation filter.

17. The receiver circuit of claim 1, further comprising:
a calculation unit associated with the filter coefficient determination unit to determine the filter coefficients, wherein the calculation unit is configured to calculate the filter coefficients, wherein filter coefficients are calculated during an operation of the receiver circuit.

18. A method for operating a receiver circuit, comprising:
receiving a received signal at an input and a control signal at another input via a feedback path;
temporally shifting the received signal to generate a temporally shifted signal based on a corresponding value of a control variable received via a feedback path;
determining filter coefficients based on a sampling time error of the received signal and a phase error of the received signal; and
filtering the temporally shifted signal based on the determined filter coefficients, wherein the temporally shifted signal depends on the received signal,
wherein the sampling time error comprises a temporal shift between an extremum of a signal pulse of the received signal and a sampling time point of the signal pulse,
wherein the temporal shift is determined based on a correlation of a portion of the received signal with a known reference sequence.

19. A receiver circuit, comprising:
a filter coefficient determination unit configured to determine filter coefficients based on a sampling time error of a received signal and a phase error of the received signal;
an interpolation filter configured to filter a temporally shifted signal based on the determined filter coefficients, wherein the temporally shifted signal depends on the received signal;
a correlator unit configured to determine a channel impulse response depending on the received signal; and
a determination unit configured to determine the phase error and the sampling time error depending on the channel impulse response and a reference function, and provide the determined phase error and the determined sampling time error to the filter coefficient determination unit configured to determine the filter coefficients.

* * * * *